United States Patent [19]

Bachel et al.

[11] Patent Number: 4,752,653
[45] Date of Patent: Jun. 21, 1988

[54] THERMOPLASTIC END MEMBER FOR A CABLE FITTING

[75] Inventors: Ernst Bachel, Geltendorf; Klaus Pichler, Otterfing; Wolfgang Giebel, Planegg, all of Fed. Rep. of Germany

[73] Assignee: Siemens Aktiengesellschaft, Berlin and Munich, Fed. Rep. of Germany

[21] Appl. No.: 918,473

[22] Filed: Oct. 14, 1986

[30] Foreign Application Priority Data

Oct. 14, 1985 [DE] Fed. Rep. of Germany ....... 3536597

[51] Int. Cl.[4] ............................................. H02G 15/04
[52] U.S. Cl. .................................... 174/93; 174/77 R
[58] Field of Search .......................... 174/77 R, 92, 93

[56] References Cited

U.S. PATENT DOCUMENTS

| 4,002,818 | 1/1977 | Kunze | 174/92 X |
| 4,103,911 | 8/1978 | Giebel et al. | 174/77 R X |
| 4,492,816 | 1/1985 | Morel et al. | 174/92 |

FOREIGN PATENT DOCUMENTS

| 2789 | 12/1978 | European Pat. Off. | 174/93 |
| 2432384 | 1/1976 | Fed. Rep. of Germany | 174/77 R |
| 2652803 | 6/1978 | Fed. Rep. of Germany | 174/92 |
| 2818566 | 7/1979 | Fed. Rep. of Germany | 174/77 R |
| 2826584 | 12/1979 | Fed. Rep. of Germany | 174/93 |

Primary Examiner—Morris H. Nimmo
Attorney, Agent, or Firm—Hill, Van Santen, Steadman & Simpson

[57] ABSTRACT

The present invention is directed to an end member for a cable fitting which is formed by at least two sealing bodies secured together on a joining plane and have a laminar constructively arranged sealing element and a gripping device being integrated in the bodies to grip the cable inserted through a cable inlet and for transferring forces between the cable gripped by one end member to another end member of the cable fitting, said gripping device including clamping members acting on a disk member which is movable in a guide provided on each of the sealing bodies.

8 Claims, 3 Drawing Sheets

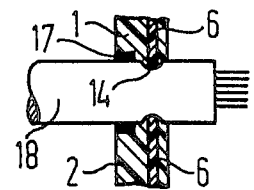
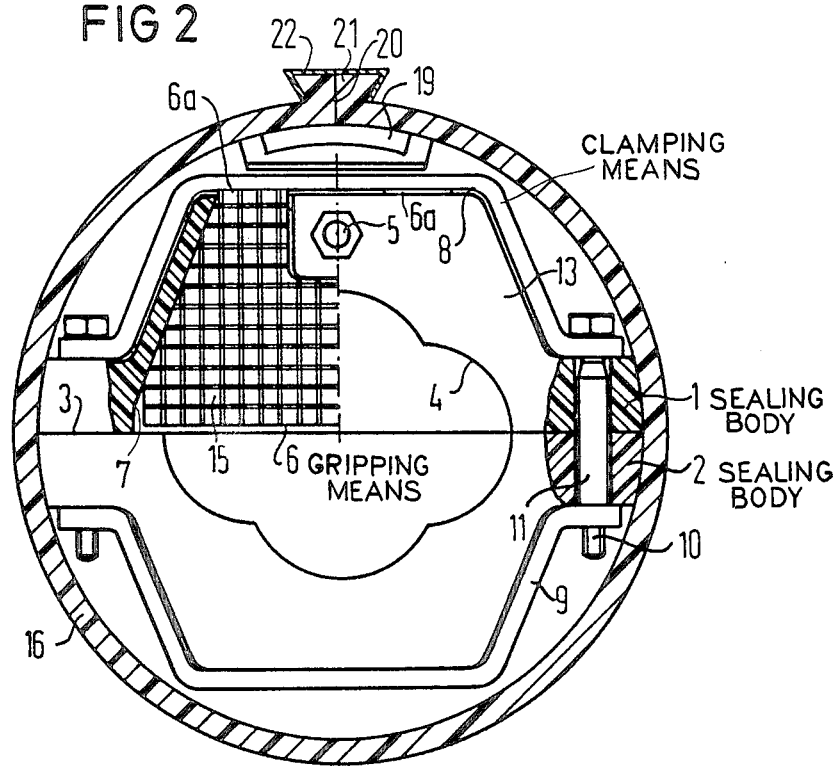

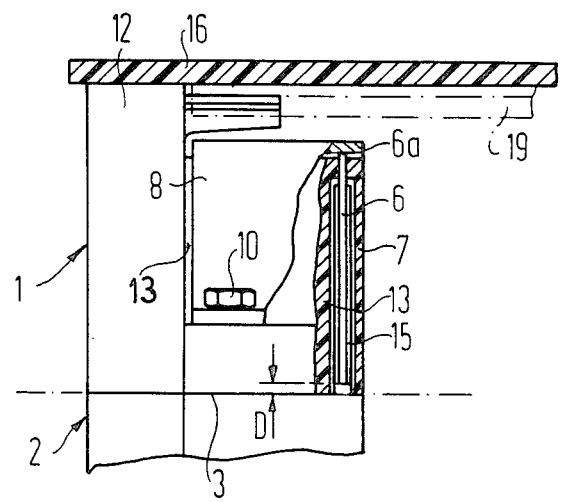
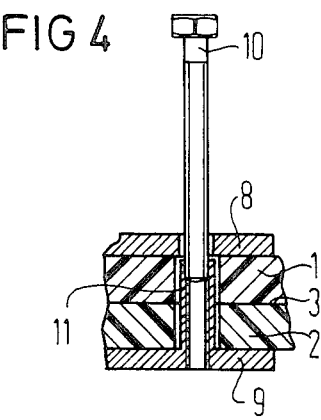

THERMOPLASTIC END MEMBER FOR A CABLE FITTING

BACKGROUND OF THE INVENTION

The present invention is directed to an end body or member for a cable fitting which member is made of thermoplastic, synthetic resin. The end member has sealing elements for the cables which are to be inserted in the direction of insertion in the cable inlets of the end bodies which inlets are adapted to the diameter of the cables.

In German Pat. No. 2,427,677 and its corresponding U.S. Pat. No. 4,103,911, end members, which are formed of two or more sealing bodies which are secured together, are used with a divided cable sleeve to form a longitudinally divided cable fitting. Each of the sealing bodies of these end members are made of a synthetic resin and have laminar sealing elements which are consecutively arranged in the direction of the cable insertion and have inserts which are made of a plastic sealing substance. The laminar sealing elements are adapted to the diameter of the cable which is to be inserted through the end member and are cut out with the aid of a corresponding auxiliary device. The end members, which are formed by the interconnected sealing bodies, are connected to each other by means of connecting rails or bars so as to be resistant to both tension and compression forces. However, in these embodiments, gripping elements, which will transfer forces between the cables inserted into one end member to the cables inserted in the other end member, are affected independent of the sealing bodies so that additional independent gripping elements have to be used.

SUMMARY OF THE INVENTION

The object of the present invention is to provide an end member formed of sealing bodies for a cable fitting of the type wherein the sealing elements and the gripping elements for transferring the force between the cables of one end member to the other end member are integrated.

To accomplish these goals, the present invention is directed to an improvement in an end member for a cable fitting which member is made of two or more sealing bodies that are joined together and are composed of a thermoplastic synthetic resin, said sealing bodies have cables inlets adapted to the diameter of the cables and are provided with sealing elements for engaging the cables inserted into the inlets. The improvements comprising the sealing bodies having gripping means for a transmission of forces from cables of one end member to an opposite end member being integrated into the sealing bodies, said sealing bodies having a guide and a clamping arrangement for the gripping means to act upon the entire periphery of an inserted cable.

The advantages of the invention are that in addition to the sealing region, the gripping means for transferring the forces between the cables inserted in one end member to the other end member are arranged in the sealing bodies forming the end members. Moreover, it is advantageous that all the inserted cables are simultaneously picked up by the gripping means which have previously not been possible because each cable had to be gripped by a respectively independent element. Thus, in addition to the simplified construction, the assembly operations are considerably improved in relation to the prior art and the required guidelines can be fully adhered to. It is also worth mentioning that the corresponding dimensions of the pressure elements for the cable gripping means are such that damage to the cable core by impermissible compression can be practically eliminated.

Other advantages and features of the present invention will be readily apparent from the following description of the preferred embodiments, the drawings and claims.

BRIEF DESCRIPTION OF THE DRAWINGS

FIG. 1 is a cross sectional view with portions in elevation to illustrate the principle of an end member with sealing bodies having both sealing elements and gripping elements which are combined together;

FIG. 2 is a transverse cross sectional view of a cable fitting adjacent an end member with portions in elevation for purposes of illustration showing an exemplary embodiment of the end member in accordance with the present invention;

FIG. 3 is a partial side view with portions broken away for purposes of illustration of a cable fitting utilizing the end member of the present invention;

FIG. 4 is a partial cross sectional view with portions in elevation illustrating a clamping arrangement for the gripping means of the present invention.

DESCRIPTION OF THE PREFERRED EMBODIMENTS

Figure 5:
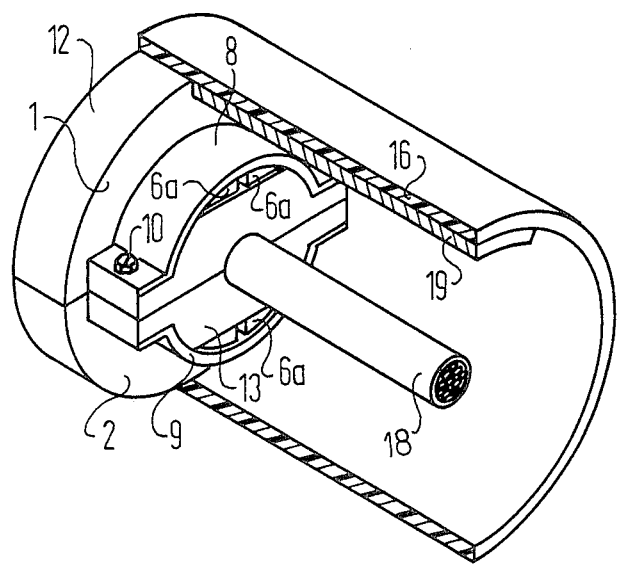
FIG. 5 is a perspective view of a portion of a cable fitting with portions broken away to illustrate the end member of the present invention.

The principles of the combination sealing elements and gripping means of the present invention are illustrated in FIG. 1. As illustrated, an end member consisting of two components formed by sealing bodies 1 and 2 is used for sealing an inserted cable 18 by an insertion of a corresponding sealing element of sealing material 17. In a second region 14 of the member, the gripping means is carried out by inserted disk members 6 and in this region, the cable is permissibly compressed as a result of the disk members 6 which are compressed by clamping devices. It is, therefore, clear that the sealing element 17 and gripping means for the cables are combined in the sealing bodies 1 and 2.

An end view with portions removed of the an end member having the sealing bodies 1 and 2 is illustrated in FIG. 2 and includes an inner component 13 (best illustrated in FIG. 5) for each of the sealing bodies. This inner component has a guiding slot 7 (FIG. 3) which receives the disk members 6. A region 4 in which the cables of different sizes and quantities are inserted at a front end of the end member formed by the sealing bodies 1 and 2 is illustrated in FIG. 2. This is also the region where the integrated gripping means is to be fully effective over all the cables. Laminar or plate-like sealing elements, which are cut out or bored to provide openings in accordance with the diameter and the number of cables to be inserted and which are consecutively arranged in the axial direction, are positioned in the sealing region 14 for the member formed by the two sealing bodies 1 and 2.

However, for the novel cable gripping means, a similar laminar element is used, such as the disk member 6, which although it is mechanically stronger in accordance with this function, is likewise provided with a bore or opening during the boring process for the cable insertion inlets so that there is no additional operation for this purpose. Moreover, in contrast to the sealing elements, the disk member 6 is arranged in a guide formed by the slot 7 (FIG. 3) in the sealing bodies 1 and 2 so as to be displaceable at right angles to the axial direction for the sealing bodies.

In the exemplary embodiment, the guide is designed as a slot 7 but also can take different forms. For example, guides can be formed by a plurality of angle members attached to a surface of each of the bodies 1 and 2. Thus, since circular recesses wherein the cables are guided are formed when the halves or sealing bodies 1 and 2 of the end member are joined or assembled together, the prerequisite for surrounding the individual inserted cables in accordance with their position is provided. However, during the boring process, the disk members are not fully inserted to a joining or separation plane 3 between the bodies 1 and 2 so that opening, that are cut into the disk members are somewhat smaller than the openings in the fixed laminar sealing elements. It is thereby achieved that during the compression with the aid of clamping means formed by clamping elements 8 and 9, the disk member 6 is compressed onto the cable sheath as a result of the constricted opening and even necks or crimps down the sheath to a permissible extent (see FIG. 1). It is further to be understood that the sealing substance for sealing the joining plane 3 is not inserted into the region for the gripping means so that the disk members have the direct effect on the cable sheath by means of their constricted opening.

The disk members 6 preferably have ribs or grid-like surface structures 15 (FIG. 2) whereby the cut edge of the opening can be more easily compressed onto the cable sheath. The transverse structure in the contact surface of the disk members 6, which structure is directed towards the cable sheath, provide a protection against torsional forces.

The size of the disk members 6 are dimensioned to be such that they definitely cover the full insertion region 4 (FIG. 2) for the cables. In addition, the disk members 6 have projections 6a which project from the inner component 13 of each of the sealing bodies in the covering region of the clamping devices or members 8 and 9. The projections 6a extend from the disk members a sufficient amount to cause a sufficient holding pressure to be exerted on the cable. On the other hand, skillful dimensioning and corresponding stops can prevent the holding pressure of the cable from exceeding the permissible values so that the cable core can be protected against damage.

In this embodiment the holding pressure is obtained with the aid of U-shaped clips or elements 8 and 9, which may be semicircular as in FIG. 5 or have the shape shown in FIG. 2. The clips are, for example, undetachably fixed upon the inner component 13 of each sealing body 1 or 2 of the sealing of the end member. After the assembly of the components 1 and 2, the pressure clips 8 and 9 are compressed by screw means 10 which protrude through the joining plane 3 and the holding pressure on the inserted cable is produced by the influence of the two pressure clips or elements 8 and 9 upon the projections 6a of the disk members 6 in the two halves or bodies 1 and 2 of the end member.

In order to transfer the absorbed forces between the two end members, bars or rails 19, which bridge the splice area are arranged on each of the sealing bodies at a front end as previously known. In the sealing bodies 1 and 2 as further arranged, a through opening 5, for example, for earth or ground potential which has to be taken into consideration in the design of the disk member 6 for the cable collecting device as can be seen from FIG. 2. FIG. 2 also illustrates that the mounted bodies 1 and 2 are surrounded by a split sleeve 16, which has flanges 21 forming a slot 20 and, which is slipped onto the end members formed by the assembled bodies 1 and 2 and is closed with the aid of a conventional longitudinal locking apparatus or member 22.

As best illustrated in FIG. 3, each of the sealing bodies at the end of the inner component 13 has the gripping means; however, this is not the only feasible position. In the part of the inner component 13 of the sealing body of which a portion is broken away for purposes of illustration, the slotted guide 7 is visible and guides the disk member 6 for producing holding pressure upon the cables that are inserted. The disk member 6 extends at right angles to the split plane 3 for the two bodies. It is further clear that in the region of the separating or split plane 3, the inserted disk member 6 is only positioned at a distance D (FIG. 3) which approximately corresponds to the thickness of the sealing material which is inserted into the sealing region. Moreover, as mentioned hereinbefore, the inlets formed in each of the disk members 6 is smaller than the inlets formed in the body portions in order to obtain the required compression on the cable inserted into the openings or inlets. At the upper end of the inner component 13 of the sealing body, the projection 6a extends out of the body for engagement by the clamping arrangement of the pressure clip, which is depressed with the aid of a screw element 10. Thus, the disk member 6 is moved in a direction of the joining plane 3 where it exerts the required holding pressure on all inserted cables. The sealing region 12 for each of the sealing bodies is axially spaced from the gripping means and is engaged by the surrounding sleeve 16. The connecting rail or bar 19 for bridging and transferring the tension and pressure forces between the two end members is illustrated in broken lines and is connected to a bracket provided on the end member.

A locking device which is a part of the gripping means, operates with the aid of the screw 10 is best illustrated in FIG. 4. The upper clip 8 is provided with a screw 10 which is preferably arranged so as to be detachable whereas the lower clip 9 is provided with at threaded sleeve 11 which protrudes into the bores on both of the halves or bodies 1 and 2 of the sealing body and the joining plane 3 which is located therebetween. The threaded sleeve 11 is preferably secured to the pressure clip 9 so as to be undetachable. Because the sleeve 11 protrudes through the joining or separation plane 3 between the two halves or bodies 1 and 2, it ensures that when a sealing substance is applied onto the split plane 3, the bore and the thread remain free. An initial centering can additionally be carried out with the aid of the locking sleeve 11 during the assembly of the two halves or bodies 1 and 2 to form the end member. The plates or disk members 6 can also be used if the cable inlets are not cut out. For example, fixed cable inlet openings are arranged in the sealing region. It is also possible to use disk members, which likewise already have preformed cable inlets and they can be used in accordance with the invention in the region of the cable gripping means. It is then expedient to have available a certain set with corresponding diameter variations for different applications. The mode of operation does not change relative to the previously described embodiment so that the object of the invention is likewise fulfilled in this manner.

Sealing and fitting of the halves 1 and 2 to form the end members do not necessarily have to be carried out simultaneously with the compression of the plates or disk members for the gripping means because the two processes are not dependent on one another. Thus, it may be advantageous to first assemble the halves of the bodies and subsequently operate the gripping means by securing the pressing clips.

Any conventional thermoplastic resin material which has a sufficient hardness for transferring of the holding pressure may be used as the material for the disk members 6. In order to limit the force, an appropriate hard elastomer may be used which will yield if the permissible pressure is exceeded.

Although various minor modifications may be suggested by those versed in the art, it should be understood that we wish to employ within the scope of the patent granted hereon, all such modifications as reasonably and properly come within the scope of our contribution to the art.

We claim:

1. In an end member for a cable fitting, said end member being formed by at least two joined together sealing bodies of a thermoplastic resin, said end member having at least one cable inlet having an axis, said cable inlet being adapted to the diameter of a cable to be inserted therein, said end member having at least one sealing element for forming a seal between the cable inlet and any cable inserted into the inlet, the improvement comprising the end member having means for gripping each cable and transferring forces between each cable which is secured in said end member to an opposite end member, said means including each of the sealing bodies forming the end member having a guide, a disk member for each sealing body being received in said guide to extend at right angles to an axis of the cable inlet, each disk member being adapted to a diameter of the cable being inserted into the end member, and clamping means for pressing the disk members at right angles to the axis of the cable inlet so that when a cable is inserted through a cable inlet, the clamping means urges the disk members to grippingly engage said cable.

2. In an end member according to claim 1, wherein the clamping means consists of a pair of pressure clips which are pressed together by screw elements against the disk members which are movable along the guide.

3. In an end member according to claim 1, wherein the disk members are exchangeable in respect to openings of predetermined diameters.

4. In an end member according to claim 1, wherein the lateral surface of each of the disk members have a surface structure formed of ridges.

5. In an end member according to claim 1, wherein the clamping means includes a pair of pressure clips interconnected by screw elements with one pressure clip being mounted in each of the sealing bodies and the screw elements are undetachable therefrom.

6. In an end member according to claim 5, wherein one pressure clip is arranged with a screw bolt and the other pressure clip is provided with a sleeve nut, said sleeve nut having a length that protrudes across a split plane between the two sealing bodies and being arranged adjacent the other pressure clip.

7. In an end member according to claim 1, wherein each inlet of each disk member is displaced a distance D toward an edge of the disk member adjacent a joining plane, said distance D corresponding to a thickness of a sealing material to be inserted between the body and cable.

8. In an end member according to claim 1, wherein the guide in the sealing bodies is formed by a slot.

* * * * *